April 14, 1936.　　F. L. G. KOLLMORGEN　　2,037,030
NAVIGATION INSTRUMENT
Filed May 2, 1935　　3 Sheets-Sheet 3
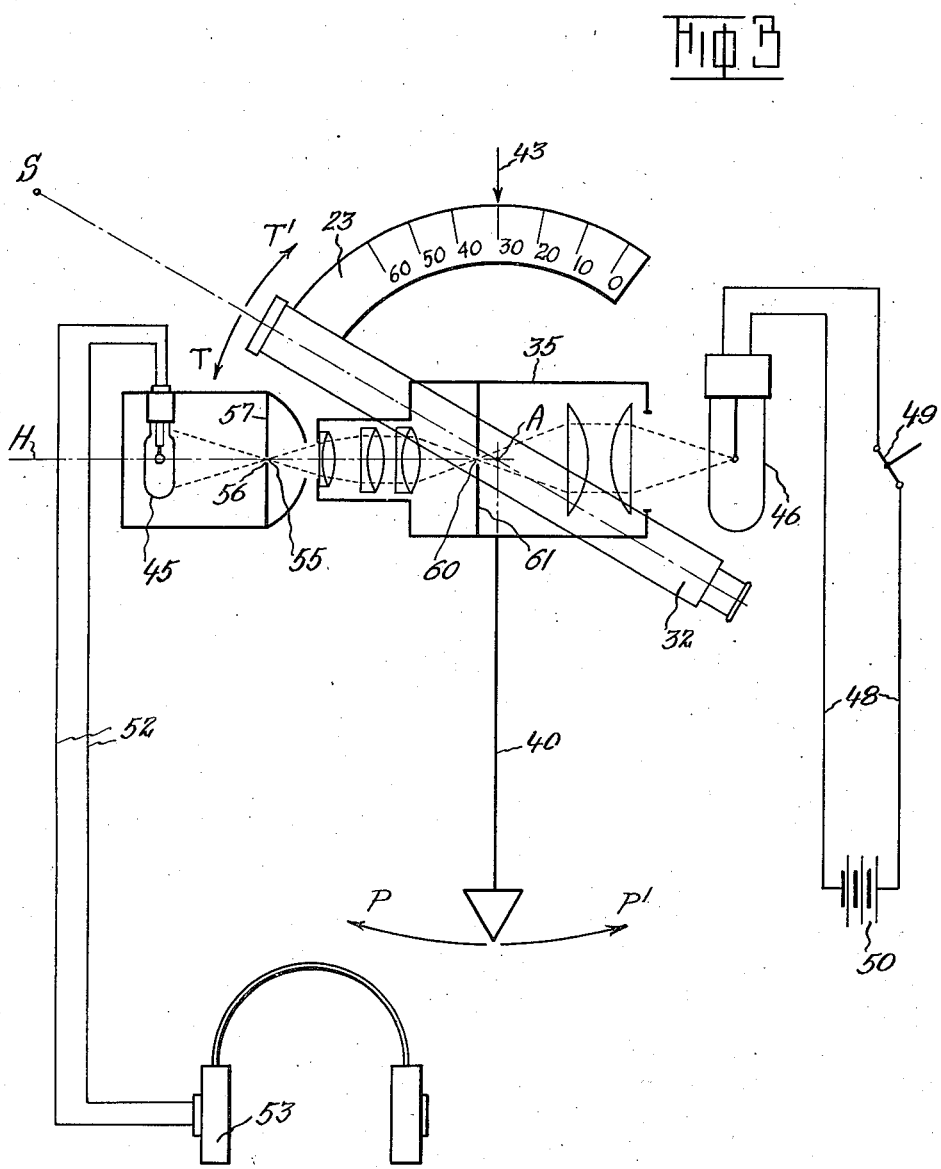

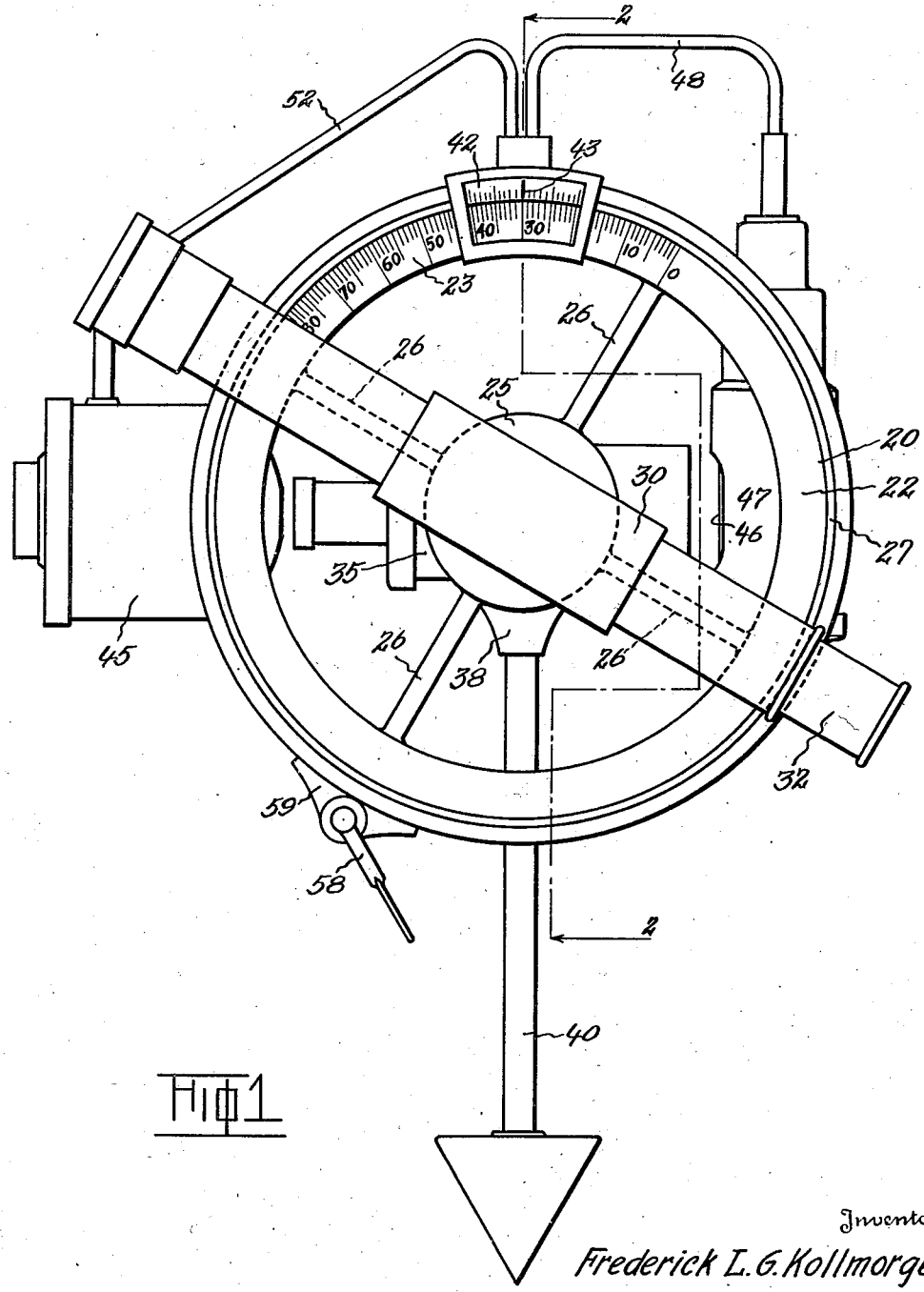

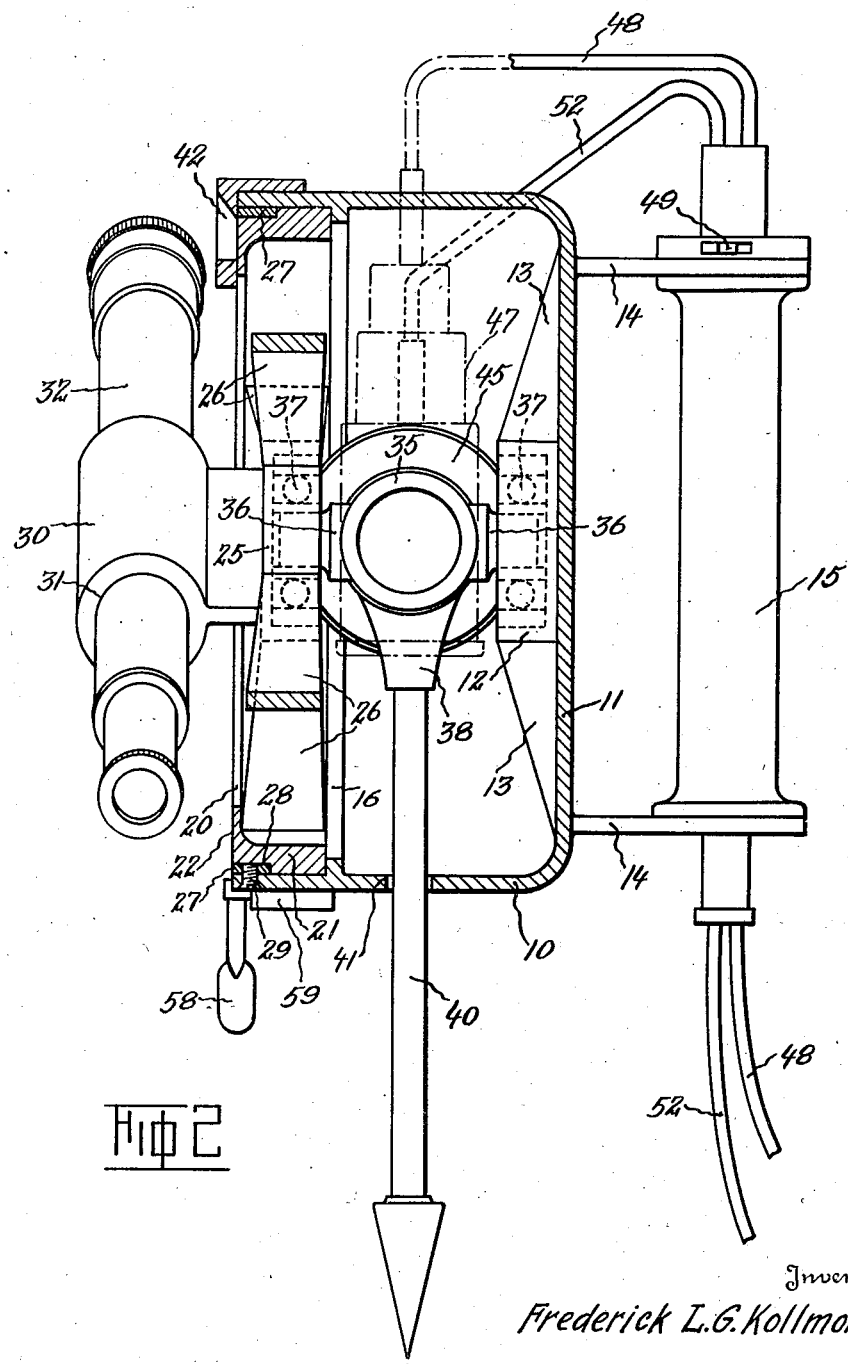

Patented Apr. 14, 1936

2,037,030

UNITED STATES PATENT OFFICE 2,037,030

NAVIGATION INSTRUMENT

Frederick L. G. Kollmorgen, Mountain Lakes, N. J.

Application May 2, 1935, Serial No. 19,393

12 Claims. (Cl. 33—61)

This invention relates to an angle-determining instrument which may be used as a sextant, quadrant or octant depending on the maximum angle which is to be measured, used for obtaining stellar altitudes at sea or in the air and has for its main object the maintaining of a true horizon.

An object of the invention is to provide an improved simplified construction wherein the angle of the sun or star or other object in respect to the horizon may be secured when the horizon is covered by mist or fog, or located on an unknown angular distance below the observer, as for instance seen from an airplane or airship.

Another object of the invention is to provide an instrument of the nature of a sextant, quadrant or the like which may be used to secure the angle between the sun or other celestial object and the horizon either when the horizon is visible or obscured by cloud or fog, or located on an unknown angular distance below the observer, as for instance seen from an airplane or airship.

A further object, more specifically, is to provide a navigation instrument wherein the horizon is not indicated by optical means, but by an electrical device that functions to notify the observer when the true horizon line has been located.

An additional object is to embody with the electrical device which may be a photo-electric cell an auxiliary electrical device that will indicate to the observer either by a visual or audible signal the moment the instrument has been positioned in the location of the true horizontal in order that the observer may then clamp the vernier thereon to read the angle of elevation.

A still further object is to provide an apparatus of the above character of compact construction which may be easily and conveniently handled and in which the electrical and optical parts are carefully housed to protect the same principally from shock, atmospheric conditions, etc.

Other objects will be in part obvious from the following analysis of the invention and in part hereinafter pointed out in connection with the accompanying drawings illustrating a preferred embodiment of the invention and in the several views of which corresponding parts are indicated by similar reference characters.

In these drawings:—

Figure 1 is a view of the left side of the instrument viewed from its position in use.

Figure 2 is a longitudinal sectional view of the instrument taken on line 2—2, Figure 1, in the direction of the arrows.

Figure 3 is a diagram indicating how the instrument operates and is used.

Referring to the accompanying drawings by numerals, 10 indicates a casing or housing preferably cylindrical in form provided with a rear wall 11, the front of the casing being open. Formed integral with the rear wall 11 and arranged centrally thereof is an annular boss 12 reinforced by the webs 13, all as clearly shown in Figure 2. Extending outwardly from the wall 11 and rigid therewith are vertically spaced extensions 14, between which the handle 15 is mounted and secured thereto, said handle being hollow for a purpose to be hereinafter described.

Spaced inwardly from the open end of the casing 10 is an annular shoulder or flange 16 that is formed integral with said casing to provide a stop or abutment for the rotating frame 20.

The frame 20 comprises an annular ring 21 of such a diameter as to snugly fit in rotative engagement within the outer portion of the casing 10, the width of the frame being such that the inner end thereof abuts the flange 16 and the outer end thereof is preferably flush with the outer edge of said casing. The outer end of the frame 20 is provided with a circular flange or face 22 on which is inscribed or attached a graduated or protractor scale 23 to be hereinafter described. Arranged concentrically within the frame 20 is an annular boss 25 identical with the annular boss 12, opposite thereto and co-axial herewith. Connecting the boss 25 to the frame 20 are the radial webs 26. To retain the frame 20 within the casing 10 there is provided a locking ring 27 that is slipped between the seat 28 provided therefor on the frame 20 and the cylindrical wall of the casing 10, the locking ring 27 being held rigid with the casing 10 by the screws 29.

Projecting outwardly of the frame 20 and integral with the boss 25 thereof is a bracket 30 provided with a longitudinal opening 31 within which a telescope 32 is positioned and locked thereto in any suitable manner. The telescope 32 is of the usual kind employed in instruments of this character. It is thus apparent from this construction that the telescope 32 is mounted for rotative movement relative to the casing 10 and that as the telescope is turned it will carry with it the protractor scale 23.

Arranged for oscillating movement between the bosses 12 and 25 is an optical system or light projector 35 the description and purpose of which will be hereinafter described.

The projector 35 comprises a tubular housing formed with oppositely disposed trunnions 36 that are rotatably supported respectively in the bosses 12 and 25 through the medium of ball-bearings 37 shown in dotted lines in Figure 2. Extending downwardly and also rigid with the tubular housing of the projector 35 is a bracket 38 in which is secured in any suitable manner the upper end of a pendulum 40, said pendulum extending downwardly through a slot 41 provided in the casing 10, and outwardly thereof.

Thus, it will be seen, that the pendulum 40 will control and govern the position of the projector 35, the relationship being such that the axis of the projector 35 is at right angles to the axis of the pendulum, both of said axes also intersecting in the axis of oscillation of the projector 35 in the bearings 37 which incidentally is also the axis of oscillation of the pendulum. In view of the mounting of the telescope 32 as hereinabove described, the axis of rotation of the same is co-axial with the axis of oscillation of the pendulum and the projector.

Secured to the top of the casing 10, and extending over the face 22 of the frame 20 is a window 42 having centrally inscribed thereon the index 43 to facilitate reading of the scale 23. The position of the index 43 is in the same vertical plane with the axis of the pendulum 40 when at rest.

Carried rigidly by the casing 10 and arranged opposite the light projecting end of the projector 35 is a photo-electric cell 45. Also carried by the casing 10 and rigidly secured thereto is a source of light or lamp bulb 46, preferably the type known as exciter lamp, having a straight filament, see Figure 3, located within a protective housing 47 and arranged opposite the light receiving end of the projector 35.

In Figure 2, the lamp bulb housing 47 is shown in dot and dash in order that its relative position, in this view of the parts of the instrument, may be more readily apparent.

The wires or conductors 48 supplying current to the lamp bulb 46 are passed through the handle 15. Preferably there is interposed in the line a switch 49 which may be attached to the top of the handle 15 and thus conveniently operated by the thumb of the observer. The source of electrical energy may be a battery 50 or any convenient electrical outlet.

From the photo-electric cell 45, suitable wires or conductors 52 are similarly passed through the handle 15 to be connected to some suitable signalling medium. In this case, the same are preferably connected to an audible signal device such as a pair of earphones 53 to be worn by the observer for a purpose to be hereinafter described. Interposed in the photo-electric cell connections are suitable boosters or relays, not shown, in order that sufficient current may be produced to actuate the signalling device. It is to be understood that instead of an audible signal, there may be utilized a visual signal such for example as a small light bulb. The specific manner in which the photo-electric cell controls and operates the signalling device does not constitute a part of this invention, accordingly a description and illustration thereof is not given.

The manner of using the above described instrument and the operation of the various parts thereof will now be given and is best illustrated by the diagrammatic showing in Figure 3. In this Figure 3, there is shown the axis A about which the telescope 32 carrying the protractor scale 23, the projector 35, and the fixedly supported bulb 46 and photo-electric cell 45 have relative oscillation. The bulb 46 is shown connected by the conductors 48 and switch 49 to the source of electricity or battery 50. The conductors 52 emanating from the photo-electric cell are shown connected to the ear-phones 53. The arrows T and T' indicate the movement of the telescope 32 about the axis A. For the sake of simplicity the protractor scale 23 is only shown attached to the telescope, the frame 20 being omitted. The arrows P and P' indicate the oscillatory movement of the pendulum 40. In the position of parts shown in Figure 3 the instrument is in its adjusted position on a true horizontal line indicated by the line H. The telescope is shown sighting the celestial object S. The switch 49 being closed, the lamp bulb 46 is turned on, the light thus produced entering the projector 35 where it passes through the lenses and slot 60 in diaphragm 61 to be projected and focussed at 55 at the small opening 56 in the diaphragm 57 of the photo-electric cell thus energizing the same, in the manner well known.

The observer holds the instrument by the handle 15 and with his other hand directs the telescope 32 towards the selected celestial body S to be observed. Turning the switch 49 on will supply current to the lamp bulb 46. The pendulum 40 will in the meantime be swinging freely and orienting itself into a vertical direction, its position of rest. The observer then slowly rotates the handle 15, keeping the celestial object S in the center of the field of the telescope all the time. This movement of the handle 15 will move the casing and index 43 relative to the protractor scale 23. When the focal point 55 of the light transmitted through the lenses in the projector 35 comes opposite the opening 56 in the photo-electric cell 45, the photo-electric cell will be energized and thus will transmit current to operate the ear-phones 53 worn by the observer in the production of an audible signal. Upon the indication of this audible signal, the instrument is then in an adjusted position along a true horizontal line, the observer then immediately clamping the frame 20 to the casing by operating the lever 58 of a suitable clamping device 59, thus being able to read the angle of elevation from the protractor scale 23 indicated by the index 43.

In the position of the parts of the instrument shown in the various figures, the angle of elevation of the celestial object S, see Figure 3, is 30° to the true horizontal line H.

It will thus be seen that with the focus of the light 55 registering with the small opening 56 in the diaphragm of the photo-electric cell there will be a continuous signal produced in the ear-phones thus rendering the maintaining of the instrument on a true horizon line possible. In view of the fact that a very slight movement out of the horizontal will move the focus of light 55 away from the opening 56 there will thus be caused an immediate cessation in the audible signal. There is accordingly thus produced a highly accurate angle determining instrument, that is exceedingly simple in operation and obviates the finding of the horizon by optical means.

It will be understood that although the details shown in the drawings have been described in order to show one practical form of the invention in its preferred form, it will be evident that many of the details may be changed without changing the principle or function of the device.

Having thus set forth and disclosed the nature of this invention, what is claimed is:

1. In an angle determining instrument, an electrical control means for operating a signal device to indicate the maintenance of the instrument on an horizon line including a source of light and a photo-electric cell arranged in fixed relation opposite each other, a gravity controlled light projector comprising an optical system arranged for oscillating movement between said photo-electric cell and light source and so constructed as to focus or project light on said photo-electric cell to render the same functionally operative only when the relationship between the photo-electric cell and projector is such that the instrument is adjusted on the horizon line.

2. In an angle determining instrument, means for maintaining the instrument on an horizon line while determining an angle of elevation, comprising a photo-electric cell, a light projector, a gravity controlled means rigidly connected to said light projector and oscillatable relative to said photo-electric cell, the adjustment of the instrument when on the horizon line being such that with the gravity controlled means at rest, light from the projector will be focussed on said photo-electric cell to render the same functionally operative, and a signalling medium operatively controlled by said photo-electric cell.

3. In an angle determining instrument, means for maintaining said instrument on an horizon line, comprising a source of light and a photo-electric cell arranged in fixed relation, a light projector oscillatably mounted between said photo-electric cell and light source and controllable by a level maintaining means, the adjustment of the instrument when on the horizon line being such that with the level maintaining means at rest, light from the light source will enter the projector to be focussed thereby on said photo-electric cell to render the same functionally operative, and a signalling medium operatively controlled by said photo-electric cell.

4. In an angle determining instrument, means for maintaining said instrument on an horizon line, comprising a source of light and a photo-electric cell, both rigidly carried by the instrument and arranged opposite each other, a light projector oscillatably mounted between the same and controllable by a pendulum, the adjustment of the instrument when on the horizon line being such that with the pendulum at rest, light from the source of light will pass through the projector and focus on the photo-electric cell to render the same functionally operative, and a signalling mechanism operatively controlled by said photo-electric cell.

5. In an angle determining instrument, means for adjusting the same on an horizon line comprising a light source and a photo-electric cell, an oscillatable light projector mounted between said light source and photo-electric cell, a level maintaining means rigidly supported by said projector and controlling the same, the arrangement of said light source, photo-electric cell and projector being such that with the level maintaining means at rest and the instrument adjusted on the horizon line, light from said light source will be transmitted by the projector and focused on said photo-electric cell to render the same functionally operative, and an audible signal means controlled by said photo-electric cell and operative only when the above condition exists.

6. An angle determining instrument comprising a casing, a frame mounted at one end of said casing and co-axial therewith for rotative movement relative thereto, a telescope rigidly supported by the frame normal to the axis thereof, a photo-electric cell and a source of light each rigidly supported by the casing and arranged diametrically opposite each other, a light projector positioned within said casing between said photo-electric cell and source of light and oscillatably supported by said frame and casing; said frame, casing and light projector having angular rotative movement relative to each other about a common axis, and a pendulum carried by said light projector for controlling the position of the same and so arranged that the longitudinal axis thereof intersects said common axis.

7. In an angle determining instrument comprising a casing, a level maintaining means oscillatably mounted within said casing, a light source and a photo-electric cell fixedly connected to said casing opposite to each other and arranged one on each side of said level maintaining means, a light projector rigidly supported by said level maintaining means for oscillating movement therewith, sight means rotatably mounted on said casing co-axial with the axis of oscillation of said level indicating means, a fixed index on said casing, and a protractor scale secured to said sight means and turnable therewith for angular movement relative to said fixed index.

8. In the instrument as set forth in claim 7, a signal device controlled and operated by said photo-electric cell when light is focused thereon by said light projector only when the level indicating means is at rest and the instrument adjusted on the horizon line.

9. In an angle determining instrument, a casing, a frame mounted at one end of said casing and co-axial therewith for rotative movement relative thereto, a telescope rigidly supported by said frame normal to the axis thereof, a light projector within said casing provided with oppositely disposed trunnions adapted to be pivotally supported by said frame and casing, a pendulum secured to said light projector for controlling the position thereof, said casing, frame and light projector each having angular rotative movement relative to each other about a common axis.

10. In an angle determining instrument comprising a cylindrical casing, one end thereof being open and the other end provided with an end wall, a circular frame rotatively mounted in the open end of said casing, an annular boss provided centrally on said end wall and frame and co-axially arranged opposite each other, a pendulum support provided with transversely projecting trunnions adapted to extend within said bosses, anti-friction bearing within said bosses and supporting said trunnions, and a pendulum extending through a slot in said casing and secured at its upper end to said pendulum support.

11. In the instrument as set forth in claim 10, an electrical control means for operating a signal device to indicate the maintenance of the instrument on a horizontal line positioned within said casing, said signal device being located exteriorly and independent of said instrument.

12. In the instrument as set forth in claim 10, a telescope arranged normal to the axis of the circular frame and rigidly supported thereby, a protractor scale on the face of said circular frame, a fixed index on the casing at the open end thereof, and an horizon determining mechanism arranged within said casing.

FREDERICK L. G. KOLLMORGEN.